US005210655A

United States Patent [19]
Mishali

[11] Patent Number: 5,210,655
[45] Date of Patent: May 11, 1993

[54] MULTI-VISION MIRROR FOR A REARVIEW MIRROR IN A MOTOR VEHICLE

[76] Inventor: Moti M. Mishali, 109 Brighton Way, South Merrick, N.Y. 11566

[21] Appl. No.: 833,131

[22] Filed: Feb. 10, 1992

[51] Int. Cl.⁵ .................................................. G02B 5/08
[52] U.S. Cl. ...................................... 359/850; 359/871
[58] Field of Search ................. 359/850, 854, 864, 871

[56] References Cited

U.S. PATENT DOCUMENTS

| 2,582,651 | 1/1952 | Peterson | 359/865 |
| 4,598,982 | 7/1986 | Levine | 359/865 |
| 4,863,254 | 9/1989 | Dyer | 359/871 |
| 4,892,400 | 1/1990 | Brooks et al. | 359/865 |

FOREIGN PATENT DOCUMENTS

| 3302735 | 8/1984 | Fed. Rep. of Germany | 359/866 |
| 2040893 | 9/1980 | United Kingdom | 359/866 |
| 2223724 | 4/1990 | United Kingdom | 359/850 |

Primary Examiner—Bruce Y. Arnold
Assistant Examiner—J. P. Ryan
Attorney, Agent, or Firm—Michael I. Kroll

[57] ABSTRACT

A multi-vision mirror is provided for a rearview mirror having an image reflector in a motor vehicle which consists of a housing, a second image reflector mounted within the housing and a mechanism for connecting the housing with the second image reflector therein to the right side of the rearview mirror in the motor vehicle. A blind spot on the right side and right side behind the motor vehicle will be eliminated to allow the driver to increase an overall vision at all times.

8 Claims, 2 Drawing Sheets

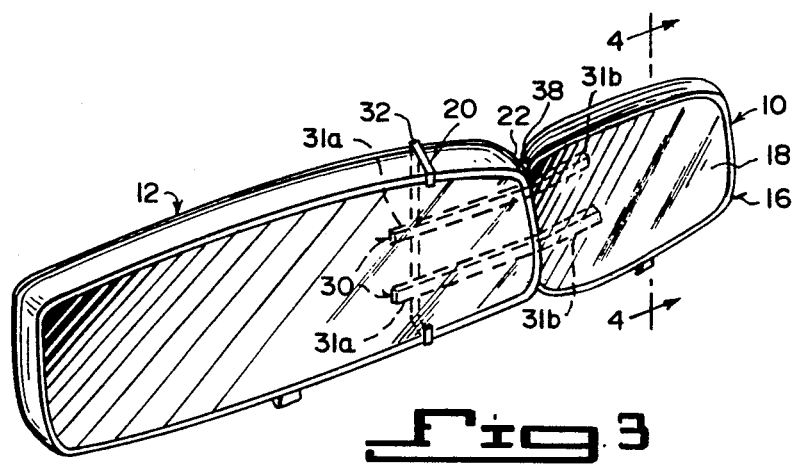
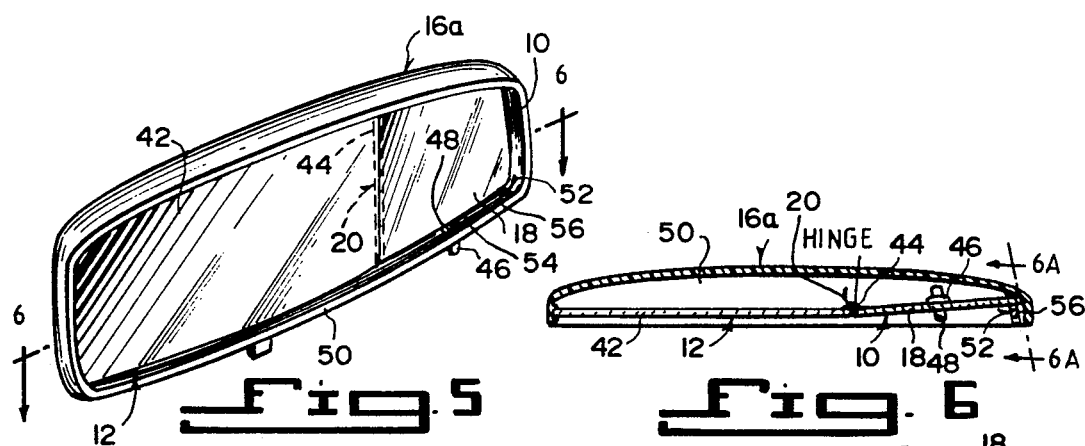
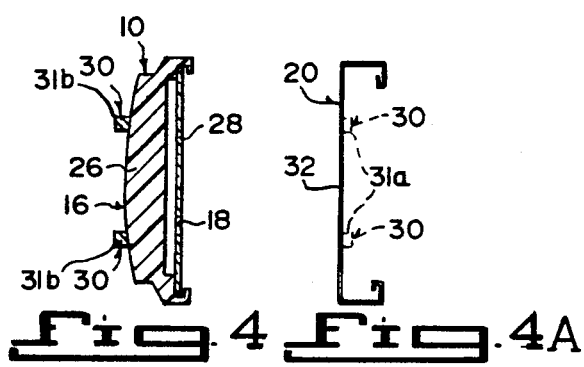
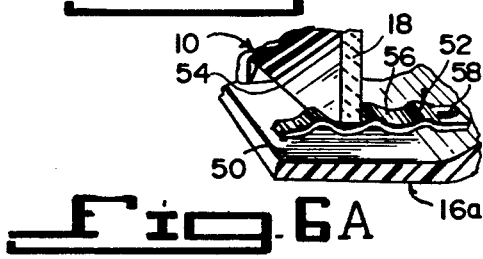

MULTI-VISION MIRROR FOR A REARVIEW MIRROR IN A MOTOR VEHICLE

BACKGROUND OF THE INVENTION

1. Field of the Invention

The instant invention relates generally to rearview mirrors and more specifically it relates to a multi-vision mirror for a rearview mirror in a motor vehicle.

2. Description of the Prior Art

Numerous rearview mirrors have been provided in prior art that are adapted to allow people in the driver seats of motor vehicles to see behind the motor vehicles when they are operating the motor vehicles. While these units may be suitable for the particular purpose to which they address, they would not be as suitable for the purposes of the present invention as heretofore described.

SUMMARY OF THE INVENTION

A primary object of the present invention is to provide a multi-vision mirror for a rearview mirror in a motor vehicle that will overcome the shortcomings of the prior art devices.

Another object is to provide a multi-vision mirror for a rearview mirror in a motor vehicle that will eliminate the blind spot on the right side of the motor vehicle and maintain actual vision at all times, thereby increasing overall vision.

An additional object is to provide a multi-vision mirror for a rearview mirror in a motor vehicle that will eliminate the need for the passenger sideview mirror, thereby reducing potential damage to the exterior of the motor vehicle.

A further object is to provide a multi-vision mirror for a rearview mirror in a motor vehicle that is simple and easy to use.

A still further object is to provide a multi-vision mirror for a rearview mirror in a motor vehicle that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 3 is an enlarged perspective view of a first embodiment connected to the rearview mirror.

FIG. 4 is a diagrammatic cross sectional view taken along line 4—4 in FIG. 3.

FIG. 4A is a side view of the clip shown in FIG. 3.

FIG. 5 is an enlarged perspective view of a second embodiment in which the multi-vision mirror and the rearview mirror are contained in a common elongated housing.

FIG. 6 is a cross sectional view taken along line 6—6 in FIG. 5.

FIG. 6A is a cross sectional view taken along line 6A–6A in FIG. 6, showing the image reflector positioning holder in greater detail.

DETAILED DESCRIPTION OF THE PREFERRED EMBODIMENTS

Figure 1:
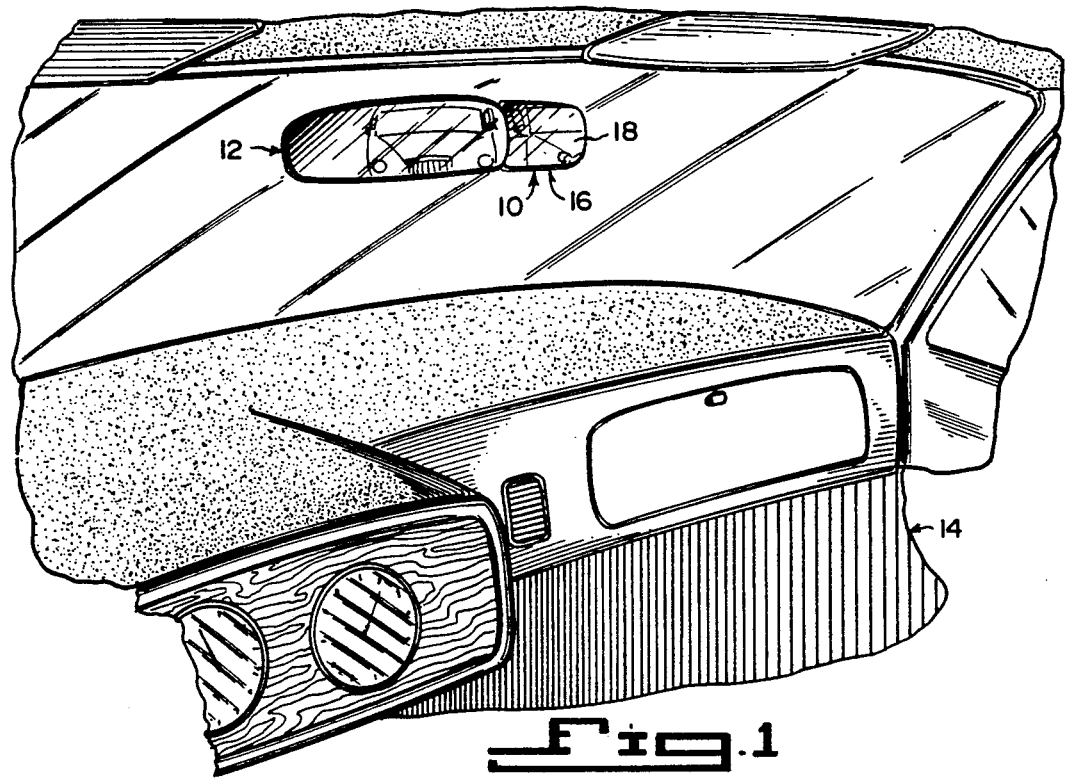
FIG. 1 is a perspective view of a portion of the interior of a motor vehicle showing the instant invention connected to the rearview mirror.
Figure 2:
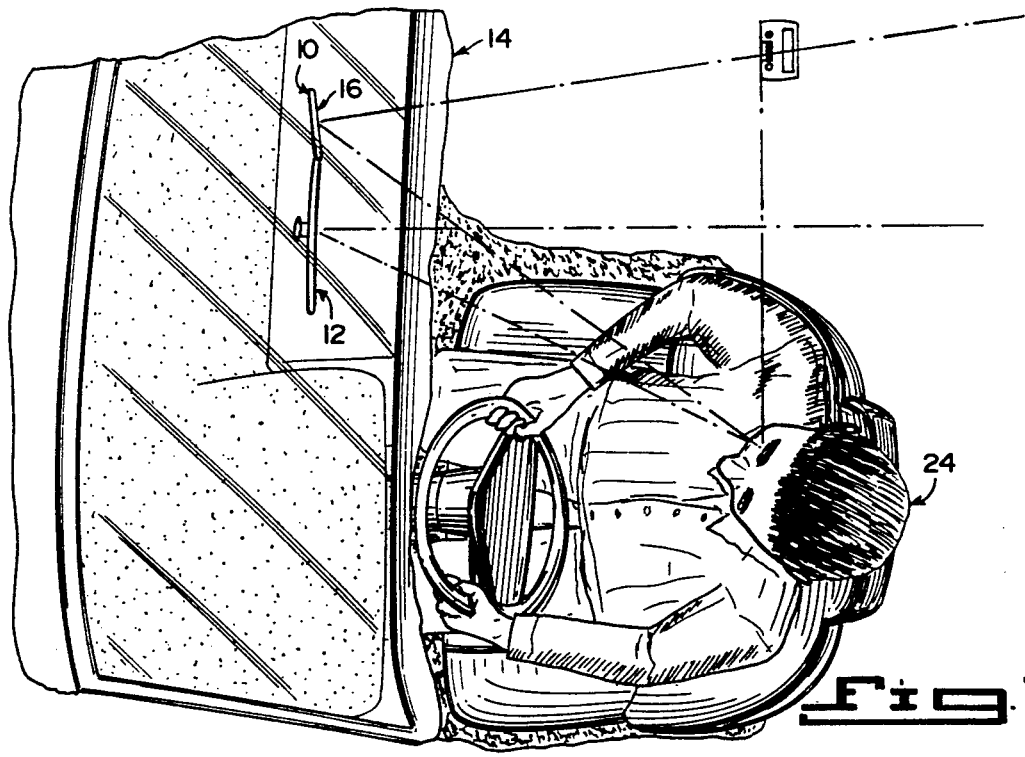
FIG. 2 is a top view of a portion of the motor vehicle with the roof broken away showing the driver utilizing the instant invention.

Turning now descriptively to the drawings, in which similar reference characters denote similar elements throughout the several views, the Figures illustrate a multi-vision mirror 10 for a rearview mirror 12 having an image reflector 13 in a motor vehicle 14. The multi-vision mirror 10 consists of a housing 16, a second image reflector 18 mounted within the housing 16 and a mechanism 20 for connecting the housing 16 with the second image reflector 18 therein to the right side 22 of the rearview mirror 12 in the motor vehicle 14. A blind spot on the right side and right side behind the motor vehicle 14 will be eliminated to allow the driver 24 to increse an overall vision at all times.

The rearview mirror 12 is set at an angle of approximately fourteen degrees, while the housing 16 of the multi-vision mirror 10 is set back at an angle of approximately between five to seven degrees from the rearview mirror 12 for optimum viewing by the driver 24 of the motor vehicle 14. The housing 16 is fabricated out of a durable material, typically plastic 26, while the second image reflector 18 is fabricated out of a durable material, typically silver coated glass 28.

The connecting mechanism 20, shown in FIGS. 3, 4 and 4A, includes a pair of spaced apart arms 30, each having a long segment 31a and a short segment 31b bent back at the angle of approximately between five to seven degrees. The short segment 31b is permanently affixed horizontally to the rear surface of the housing 16, while the long segment 31a is placed against the rear surface of the rearview mirror 12. An elastic clip 32 snaps onto the rear surface of the rearview mirror 12, so as to hold the long segments 31a of the arms 30 thereto.

The housing 16a in FIGS. 5, 6 and 6A, is elongated to retain both the first image reflector 13 and the second image reflector 18 therein. The connecting mechanism 20 is a hinge 44 between the right side of the first image reflector 13 and the left side of the second image reflector 18. An angle adjustment lever 46 is mounted through a slot 48 in the bottom 50 of the elongated housing 16a and is connected to a bottom edge 54 of the second image reflector 18, so that the angle of the second image reflector 18 can be angularly adjusted thereto.

A image reflector positioning holder 52 is mounted on the bottom 50 of the elongated housing 16a and is in engagement with the bottom edge 54 of the second image reflector 18, so that the second image reflector 18 can be locked in one of a plurality of angular positions. The image reflector positioning holder 52 is a flexible wavy strip member 56. A fastener 58 is provided for affixing the flexible wavy strip member 56 onto the bottom 50 of the elongated housing 16a, so that the flexible wavy strip member 56 can engage with the bottom edge 54 of the second image reflector 18 of the multi-vision mirror 10.

The size of the second image reflector 18 can be, but not limited to, approximately four inches long and two and three eights high. Each arm 30 can be approximately, but not limited to, one quarter of an inch wide and three inches long; with the long segment 31a being two inches long and the short segment 31b being one inch long.

To use the multi-vision mirror 10 the following steps should be taken:

1. Attach the housing 16 at its left side 38 to the right side 22 of the rearview mirror 12, by the connecting mechanism 20.
2. The angle of the rearview mirror 12 should be set at approximately fourteen degrees.
3. The angle of the multi-vision mirror 10 will be set back at approximately five to seven degrees with respect to the rearview mirror 12.
4. The driver can now look into both the rearview mirror 12 and the multi-vision mirror 10 to see both the blind spot on the right and directly behind the motor vehicle 14.
5. If the multi-vision mirror 10 is built into the elongated housing 16a with the rearview mirror 12, as shown in FIGS. 5 through 6A, step one can be eliminated.

LIST OF REFERENCE NUMBERS 10 multi-vision mirror
12 rearview mirror
13 first image reflector in 12
14 motor vehicle
16 housing
16a elongated housing
18 second image reflector in 10
20 connecting mechanism
22 right side of 12
24 driver
26 plastic for 16
28 silver coated glass for 18
30 arm
31a long segment of 30
31b short segment of 30
32 elastic clip
38 left side of 16
44 hinge between 13 and 18
46 angle adjustment lever
48 slot in 50
50 bottom of 16a
52 image reflector positioning holder
54 bottom edge of 18
56 flexible wavy strip member for 52
58 fastener It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A multi-vision mirror for a rearview mirror having an image reflector in a motor vehicle which comprises:
   a) a housing, said housing is fabricated out of a durable material, typically plastic, said housing is elongated to retain both the first image reflector and said second image reflector therein;
   b) a second image reflector mounted within said housing, said second image reflector is fabricated out of a durable material, typically silver coated glass;
   c) means for connecting said housing with said second image reflector therein to the right side of the rearview mirror in the motor vehicle, so that a blind spot on the right side and right side behind the motor vehicle will be eliminated to allow the driver to increase an overall vision at all times, the rearview mirror is set at an angle of approximately fourteen degrees, while said housing of said multi-vision mirror is set back at an angle of approximately between five to seven degrees from the rearview mirror for optimum viewing by the driver of the motor vehicle, said connecting means includes a pair of spaced apart arms, each having a long segment and a short segment bent back at the angle of approximately five to seven degrees, whereby said short segment is permanently affixed horizontally to the rear surface of said housing, while said long segment is placed against the rear surface of the rearview mirror, an elastic clip to snap onto the rear surface of the rearview mirror, so as to hold said long segments of said arms thereto, and the right side of said multi-vision mirror having two arms molded to the rear surface thereof bent backward at an angle of five to seven degrees, with these two said arms attached to the rearview mirror by an elastic clip that snaps onto the rear surface of the rearview mirror, and a hinge between the right side of the first image reflector and the left side of said second image reflector; and
   d) an angle adjustment lever mounted through a slot in the bottom of said elongated housing and connected to a bottom edge of said second image reflector, so that the angle of said second image reflector can be angularly adjusted thereto.

2. A multi-vision mirror for a rearview mirror in a motor vehicle as recited in claim 1, wherein said housing is fabricated out of a durable material, typically plastic.

3. A multi-vision mirror for a rearview mirror in a motor vehicle as recited in claim 2, wherein said second image reflector is fabricated out of a durable material, typically silver coated glass.

4. A multi-vision mirror for a rearview mirror in a motor vehicle as recited in claim 3, wherein said housing is elongated to retain both the first image reflector and said second image reflector therein.

5. A multi-vision mirror for a rearview mirror in a motor vehicle as recited in claim 4, wherein said connecting means includes a hinge between the right side of the first image reflector and the left side of said second image reflector.

6. A multi-vision mirror for a rearview mirror in a motor vehicle as recited in claim 5, further including an angle adjustment lever mounted through a slot in the bottom of said elongated housing and connected to a bottom edge of said second image reflector, so that the angle of said second image reflector can be angularly adjusted thereto.

7. A multi-vision mirror for a rearview mirror in a motor vehicle as recited in claim 6, further including an image reflector positioning holder mounted on the bottom of said elongated housing and in engagement with the bottom edge of said second image reflector, so that said second image reflector can be locked in one of a plurality of angular positions.

8. A multi-vision mirror for a rearview mirror in a motor vehicle as recited in claim 7, wherein said image reflector positioning holder includes:
 a) a flexible wavy strip member; and
 b) a fastener for affixing said flexible wavy strip member onto the bottom of said housing, so that said flexible wavy strip member can engage with the bottom edge of said second image reflector of said multi-vision mirror.

* * * * *